United States Patent [19]

Maehara

[11] Patent Number: 4,708,407

[45] Date of Patent: Nov. 24, 1987

[54] ANTI-LOCK BRAKE SYSTEM FOR VEHICLE

[75] Inventor: Toshifumi Maehara, Saitama, Japan

[73] Assignee: Akebono Brake Industry Co., Ltd., Tokyo, Japan

[21] Appl. No.: 948,400

[22] Filed: Dec. 31, 1986

Related U.S. Application Data

[63] Continuation of Ser. No. 825,042, Jan. 31, 1986, abandoned.

[30] Foreign Application Priority Data

Feb. 6, 1985 [JP] Japan .................................. 60-21323

[51] Int. Cl.$^4$ ........................... B60T 8/40; B60T 13/70
[52] U.S. Cl. .................................... 303/116; 303/119; 303/68
[58] Field of Search ...................... 303/119, 91, 10–12, 303/13–15, 92, 68, 113, 114, 115, 116, 117, 69, DIG. 1–DIG. 4, 110; 188/181, 358–359

[56] References Cited

U.S. PATENT DOCUMENTS

| | | | |
|---|---|---|---|
| 4,116,495 | 9/1978 | Belart | 303/116 X |
| 4,179,166 | 12/1979 | Sharp et al. | 303/119 |
| 4,264,109 | 4/1981 | Knox et al. | 303/119 X |
| 4,278,300 | 7/1981 | Bacher | 303/116 X |
| 4,316,642 | 2/1982 | Belart | 303/116 |
| 4,453,782 | 6/1984 | Arikawa et al. | 303/119 X |
| 4,555,145 | 11/1985 | Maehara et al. | 303/116 X |
| 4,576,416 | 3/1986 | Müller et al. | 303/14 X |

Primary Examiner—Douglas C. Butler
Attorney, Agent, or Firm—Toren, McGeady & Associates

[57] ABSTRACT

In an anti-lock system for a vehicle having a first valve arranged in a brake fluid pressure transmission line from a master cylinder to each brake device to operate under an anti-lock control signal, a second valve arranged to open for reducing the brake fluid pressure, a pressure fluid return device arranged to bring a brake pressure fluid into an accumulator for returning the pressure fluid to the upstream side of the first valve and a gate valve arranged in between the first valve and the master cylinder, the gate valve is provided with a balance piston which is arranged to receive at one end thereof the pressure fluid brought into the accumulator and to receive the pressure fluid of the brake device at the other end; and a shut-off valve device arranged at an axially intermediate part of the balance piston to close a passage between the master cylinder and the first valve according to the balance piston.

3 Claims, 1 Drawing Figure

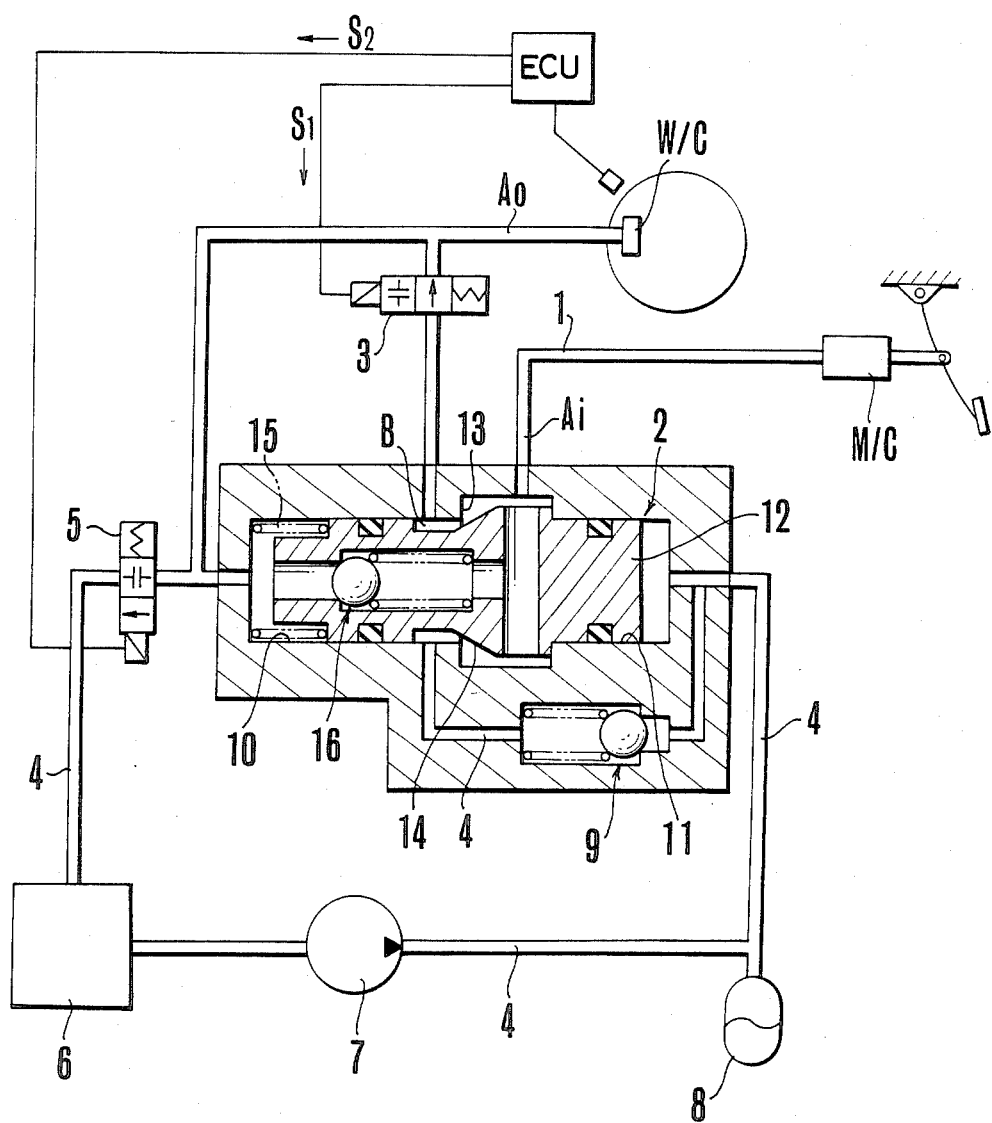

ANTI-LOCK BRAKE SYSTEM FOR VEHICLE

This is a continuation of application Ser. No. 825,042 filed Jan. 31, 1986, now abandoned.

FIELD OF THE INVENTION AND RELATED ART STATEMENT

This invention relates to an anti-lock system for a vehicle and more particularly to a system wherein a wheel locked state which might take place during brake application due to sudden drop in the wheel velocity can be removed by reducing the brake fluid pressure.

Anti-lock arrangements of varied kinds have been proposed for improved safety of vehicles during recent years. In a typical example of them, a normally open type shut-off valve is arranged in a brake fluid pressure transmission line (hereinafter referred to as the main line) connecting a master cylinder (a fluid pressure generator) to each brake device in such a way as to close the main line when it becomes necessary to drop the braking fluid pressure during anti-lock control; another line (hereinafter referred to as a by-pass line) is connected to the main line in a by-passing manner; a reducing valve is arranged to have the by-pass line normally closed and to have it opened when the brake fluid pressure must be lowered; the brake pressure fluid flowing into the by-pass line is stored in a reservoir device which is arranged, for example, to store the incoming pressure while lowering the fluid pressure by increasing the internal volume of its chamber; a pressure fluid return device which includes a pump is arranged to take up the stored fluid of the reservoir device into the main line; and the shut-off valve (of the normal open type) and the reducing valve (normally closed type) are operated by means of an electronic control circuit which is arranged to detect a locked state of a wheel during brake application to the vehicle.

The brake fluid pressure on the wheel is controlled by the vehicle anti-lock arrangement of the above stated kind in the following manner: First, to prevent the braking force from becoming excessive, the shut-off valve is initially closed to stop brake fluid pressure from further increasing. In the event that dropping of the wheel velocity cannot be stopped by this, the brake fluid pressure is released into the reservoir device by opening the reducing valve to lower the braking force thereby. If the wheel velocity is restored by the decrease of the braking fluid pressure, the pressure fluid is taken up from the reservoir device to recover the brake fluid pressure when the wheel velocity is allowed to recover by the decrease of the brake fluid pressure.

In the anti-lock system of the above stated kind, the main line which is provided for transmission of the brake fluid pressure is divided into upstream and downstream parts by the normally open type shut-off valve. During the anti-lock control operation, the process of taking up the pressure fluid from within the brake device is performed for the part of the line on the side of the master cylinder. Therefore, this causes a great change in the fluid pressure within the master cylinder. Then, this change brings about a problem known by the name of a kick-back motion on a brake pedal which is interlocked with the master cylinder.

To avoid the kick-back motion, there has been proposed a method of inserting, on the upstream side of a brake fluid pressure taking-up passage, a check valve which permits only the downstream flow of the pressure fluid, for example, as disclosed in U.S. Pat. No. 4,278,300. However, this method naturally necessitates provision of passage for returning fluid pressure toward the master cylinder at the time of brake release. Besides, in order to prevent, without fail, the reverse flow of the pressure fluid from the master cylinder toward the brake device and to prevent the brake device from dragging at the time of brake release, the fluid pressure return passage must be arranged to leave no remnant pressure within the brake device. These requirements then not only make the design work on the whole system difficult but also cause a difficulty in meeting a machining precision required.

To solve these problems of the prior art, the applicant of the present application has developed and proposed an anti-lock system including a gate valve which is capable of mechanically preventing the kick-back motion with a simple valve structure. This gate valve comprises a balance piston which is arranged on the upstream side of the by-pass passage of the above stated anti-lock system to receive fluid pressure Pi of the upstream side (on the side of the master cylinder) and downstream fluid pressure Po (on the side of the brake device) and to move under a condition of Pi>Po; and a shut-off valve which mechanically closes the main line by the movement of the balance piston. The gate valve thus has been arranged to restrict any fluid pressure variation which takes place during anti-skid control and to permit it to take place only on the downstream side of the gate valve.

SUMMARY AND OBJECT OF THE INVENTION

An object of this invention is to provide an anti-lock system wherein the above stated gate valve is improved to more reliably prevent the kick-back motion from occurring and to ensure a smoother flow of the pressure fluid from the master cylinder to the brake device by preventing any erroneous action of the gate valve from occurring during normal brake application and especially in the event of sudden brake application.

The above and further objects and features of this invention will become apparent from the following detailed description of a preferred embodiment thereof taken in connection with the accompanying drawings.

BRIEF DESCRIPTION OF THE DRAWINGS

The accompanying drawing is a schematical illustration showing in outline the arrangement of an anti-lock system embodying this invention as an embodiment example thereof.

DETAILED DESCRIPTION OF THE PREFERRED EMBODIMENTS

Referring to the accompanying drawing which shows a preferred embodiment of this invention, the illustration includes a main line 1 which is provided for transmission of brake fluid pressure from a master cylinder M/C to a brake device W/C. A normally open type gate valve 2 and a first valve 3 which is also of the normally open type (electro-magnetic valve) are inserted in the main line.

The gate valve 2 is provided with an input system on its upstream side (on the side of the master cylinder). An intermediate fluid chamber B is formed between the output fluid chamber of the gate valve 2 and the first valve 3. An output system Ao is formed in the main line on the downstream side of the first valve 3 (or on the side of the brake device). A by-pass line 4 is connected to the main line 1 between the output system Ai and the intermediate fluid chamber B. In this specific embodiment example, there are inserted in this by-pass line 4 one after another a normal open type second valve 5 which faces the output system Ao of the main line; a reservoir 6 of a small capacity; a pump 7, an accumulator 8; and a return valve 9. When the second valve 5 opens to allow the pressure fluid to flow into the reservoir 6, the pressure fluid is sucked up by the pump 7 into the accumulator 8 and is then returned to the intermediate fluid chamber B via the return valve 9.

In the arrangement described above, the first and second valves 3 and 5 are arranged as electromagnetic change-over valves. The first valve 3 is shifted from an open state to a closed state by a signal S1 which is produced from an anti-lock control circuit ECU to cause the brake fluid pressure to be stopped from increasing or to be kept unchanged. The second valve 5 is shifted from a closed state to an open state by a signal S2 which is produced to cause the brake fluid pressure to be lowered.

The reservoir device 6 and the pump 7 are selected from known products. For example, the pump 7 is arranged to perform the sucking up action in synchronism with the shift of the second valve 5 from its closed state to its open state. More specifically, an eccentric cam is rotated by a motor which is not shown to cause a plunger to reciprocate, so that the pressure fluid can be sucked up in one direction. The details of the gate valve 2 are as follows:

The gate valve 2 includes a cylinder body. The cylinder body is provided with a pair of coaxial cylinders 10 and 11 which are of the same diameter and are formed on two sides of the cylinder body. A balance piston 12 has its both ends slidably engaged with these cylinders 10 and 11. A valve body part 14 is formed in the middle portion of the balance piston 12 in such a way as to be engageable with a valve seat part 13 of the cylinder body. The valve body part 14 and the valve seat part 13 are thus arranged to serve as a shut-off valve. The communication between the input system Ai and the intermediate fluid chamber B is thus arranged to be blocked by this shut-off valve. The piping arrangement of the anti-lock system is as follows: The fluid pressure F2 of the output system Ao is arranged to act on the left end of the balance piston 12. Another fluid pressure F1 of the pressure fluid sucked up into the accumulator 8 is arranged to act on the right end of the balance piston 12. Further, the sealing sectional area of the valve seat part 13 is arranged to be substantially equal to the diameter of each of the cylinders 10 and 11. The illustration further includes a spring 15 which is arranged to stably keep the balance piston 12 in the normal open state under brake release condition. A one-way valve 16 is arranged within the balance piston 12 to have the pressure fluid of the output system Ao brought back without fail toward the input system Ai.

With the embodiment arranged as described above, the rise and drop of the braking fluid pressure are controlled in the following manner: Under a normal condition, the gate valve 2 and the first valve 3 are open and the second valve 5 is closed. Therefore, the fluid pressure generated at the master cylinder M/C is transmitted as it is to the brake device W/C. During brake release, the fluid pressure comes back as it is to the master cylinder. During the anti-lock control, the first valve 3 closes and the second valve 5 opens. Then, the pressure fluid within the brake device is taken up via the by-pass line 4 into the accumulator 8 to have the braking pressure decreased thereby. In this instance, the fluid pressure stored at the accumulator 8 acts on the right end of the balance piston 12 to move the balance piston 12 to the left. This causes the valve body part 14 to engage the valve seat part 13. After this, the brake fluid pressure can be either again increased or kept as it is by closing the second valve 5 and by opening or closing the first valve 3 as required.

This embodiment example is characterized in that: The gate valve 2 is capable of operating in a suitable manner for control over the braking fluid pressure under a normal condition and an anti-lock control condition. In other words, under the normal condition, the gate valve 2 keeps the main line open to ensure smooth transmission and return of the pressure fluid. Under the anti-lock control condition, the gate valve 2 mechanically separates the input system Ai and the intermediate fluid chamber B from each other in respect of pressure. This prevents the master cylinder from being affected by variations in pressure such as a drop and a rise in the brake fluid pressure. The balance piston 12 is arranged to move only when the fluid pressure of the output system Ao on the side of the brake device drops and the pressure fluid is taken up into the accumulator 8 accordingly. This arrangement intrinsically precludes the possibility of having the shut-off valve erroneously closed. This is a salient advantage. Further, the sectional area of the parts of the balance piston slidably engaging the cylinders 10 and 11 are arranged to be substantially equal to the sealing sectional area of the valve seat 13. By virtue of that arrangement, even in the event of quick flow of the braking pressure fluid resulting from sudden brake application or the like, no moving force comes to act on the balance piston to cause the gate valve 2 to restrict the supply of the pressure fluid in any manner. That is another advantage of this embodiment.

The vehicle anti-lock system according to this invention completely solves the problem that a change in the braking fluid pressure under an anti-lock control operation is transmitted to the brake pedal. The gate valve operates in a reliable manner and is prevented without fail from performing any erroneous action under conditions other than the anti-lock control condition. The invention thus has a great utility.

I claim:

1. In an anti-lock system for a vehicle having a first valve arranged in a brake fluid pressure transmission line from a master cylinder to each brake device to operate under an anti-lock control signal, a second valve arranged to open for reducing the brake fluid pressure, a pressure fluid return device arranged to bring the brake pressure fluid into an accumulator for returning the pressure fluid to the upstream side of said first valve and a gate valve arranged in between said first valve and said master cylinder, an improvement characterized in that:

said gate valve (2) is provided with an axial extending balance piston (12) which is arranged to receive at one end in the axial direction thereof said pressure fluid brought into said accumulator (8) and to receive said pressure fluid of said brake device (W/C) at the other end; said gate valve including a shut-off valve device (13, 14) arranged at an axially intermediate portion of said balance piston between the ends thereof to close a passage between said master cylinder (M/C) and said first valve (3) according to the movement of said balance piston, the balance piston including therein a one-way valve communicating with the other end thereof which permits the flow of the pressure oil from the brake device to the master cylinder but blocks the flow of the pressure oil from the master cylinder to the brake device.

2. In an anti-lock system for a vehicle having a first valve arranged in a brake fluid pressure transmission line from a master cylinder to each brake device to operate under an anti-lock control signal, a second valve arranged to open for reducing the brake fluid pressure, a pressure fluid return device arranged to bring the brake pressure fluid into an accumulator for returning the pressure fluid to the upstream side of said first valve and a gate valve arranged in between said first valve and said master cylinder, an improvement characterized in that:

said gate valve (2) is provided with an axial extending balance piston (12) which is arranged to receive at one end in the axial direction thereof said pressure fluid brought into said accumulator (8) and to receive said pressure fluid of said brake device (W/C) at the other end; said gate valve including a shut-off valve device (13, 14) arranged at an axially intermediate portion of said balance piston between the ends thereof to close a passage between said master cylinder (M/C) and said first valve (3) according to the movement of said balance piston, said shut-off valve device includes a valve body part (14) which is formed in the axially intermediate portion of said balance piston and a valve seat (13) which is arranged to engage said valve body part (14).

3. A system according to claim 2, wherein the pressure receiving area of said balance piston at each of the two ends thereof is approximately equal to a sealing sectional area obtainable from the engagement between said valve body part (14) and said valve seat (13).

* * * * *